(12) United States Patent
Lou

(10) Patent No.: US 6,641,885 B2
(45) Date of Patent: Nov. 4, 2003

(54) COMPLEX LAMINATED BAMBOO BOARD

(75) Inventor: Dea-Ji Lou, Dong Guan (CN)

(73) Assignee: Wei Rong Dong Guan Bamboo & Wood Products, Guandong (CN)

( * ) Notice: Subject to any disclaimer, the term of this patent is extended or adjusted under 35 U.S.C. 154(b) by 3 days.

(21) Appl. No.: 09/998,407

(22) Filed: Nov. 30, 2001

(65) Prior Publication Data

US 2003/0104166 A1 Jun. 5, 2003

(51) Int. Cl.$^7$ .................................................. B32B 3/10

(52) U.S. Cl. ........................................ 428/54; 428/119

(58) Field of Search ...................... 428/54, 119; 52/390

(56) References Cited

U.S. PATENT DOCUMENTS 3,234,074 A * 2/1966 Bryant .......................... 428/54

* cited by examiner

Primary Examiner—Alexander S. Thomas
(74) Attorney, Agent, or Firm—William E. Pelton, Esq.

(57) ABSTRACT

A complex laminated bamboo board includes an upper layer and a plurality of lower layers glued to the upper one. The upper layer consists of parallel strips and a pair of ribs alongside them. The ribs extend downward from a level not higher than a top face but not lower than a bottom face of the upper layer to below the bottom face. The lower layers are glued to the upper layer beneath the bottom face and at sides of the ribs. In addition, the strips and ribs of the upper layer are made of a first woody material but the lower layers are made of a second woody material different from the first woody material.

6 Claims, 8 Drawing Sheets

COMPLEX LAMINATED BAMBOO BOARD

BACKGROUND OF THE INVENTION

1. Field of the Invention

The present invention relates to a complex laminated bamboo board and, more particularly, to a glued board which is produced cheaply yet with sufficient resistance against warp.

2. Description of Related Art

It is usually found, in many houses, that the floors of rooms are composed of boards, known as floorboards. As shown in FIG. 1, some types of the boards are made of several layers (1, 2, 3), each consisting of glued parallel strips of a woody material—either wood or bamboo.

Irrespective of the alternative nature of the material, such boards share a common problem that they warp slightly upward or downward, as shown in FIGS. 2 and 3, with the variation of humidity within the room(s). Furthermore, the production of such boards will consume a lot of timber, resulting in excessive destruction of forest.

One of the solutions to the unreasonable consumption of timber is disclosed in a glued board shown in FIG. 4, which is made of an upper layer (4") of bamboo strips and a lower layer (5") of fiberboard glued together. This glued board can be produced cheaply, due to the fact that the fiberboard is made of fibers from wooden waste, not from timber or logs.

On the other hand, the glued board warp much more distinctly because the two layers (4", 5"), one above another, are made of different materials, which have respective sensitivities to the variation of ambient humidity.

Therefore, it is an objective of the invention to provide a glued board to mitigate and/or obviate the aforementioned problems.

SUMMARY OF THE INVENTION

The object of the present invention is to provide a complex laminated bamboo board which is produced cheaply yet with sufficient resistance against warp.

Other objects, advantages and novel features of the invention will become more apparent from the following detailed description when taken in conjunction with the accompanying drawings.

DETAILED DESCRIPTION OF THE PREFERRED EMBODIMENT

Figure 1:
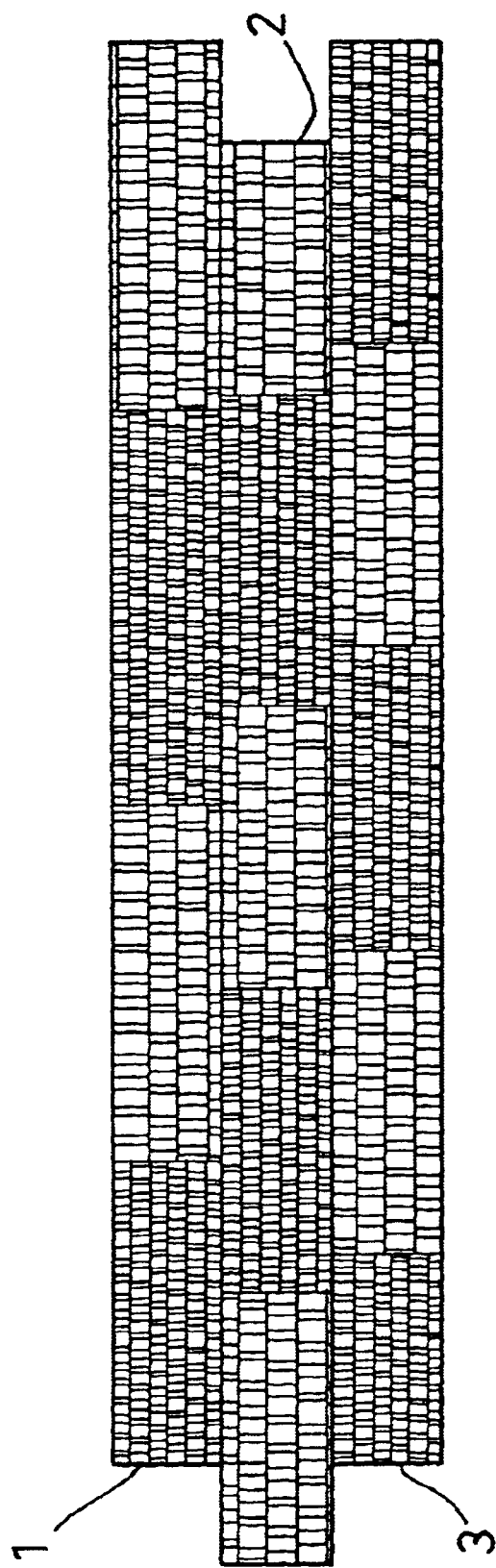
FIG. 1 is a cross-sectional view of a conventional glued board.
Figure 2:
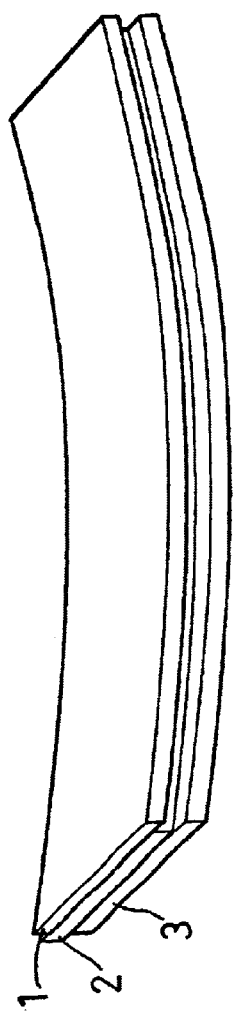
FIG. 2 is a schematic view showing the board of FIG. 1 warping slightly upward.
Figure 3:
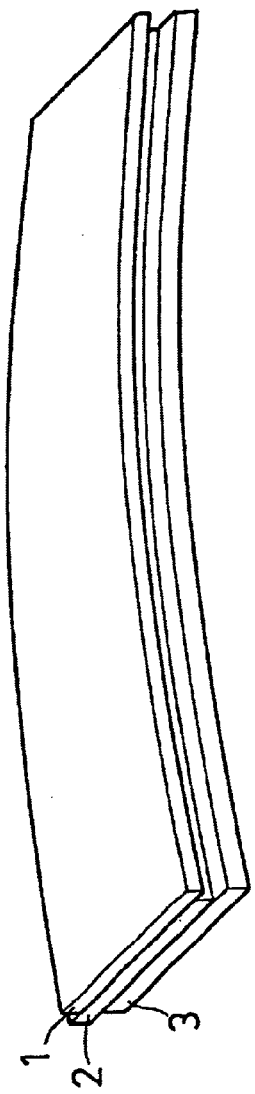
FIG. 3 is a schematic view showing the board of FIG. 1 warping slightly downward.
Figure 4:
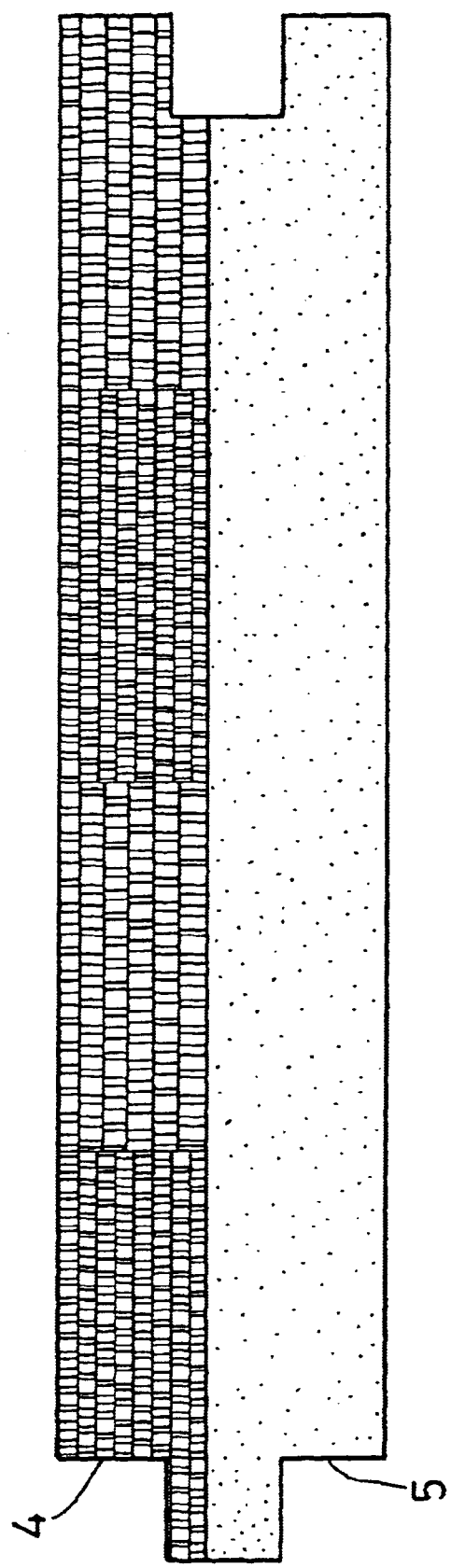
FIG. 4 is a cross-sectional view of another conventional glued board.
Figure 5:
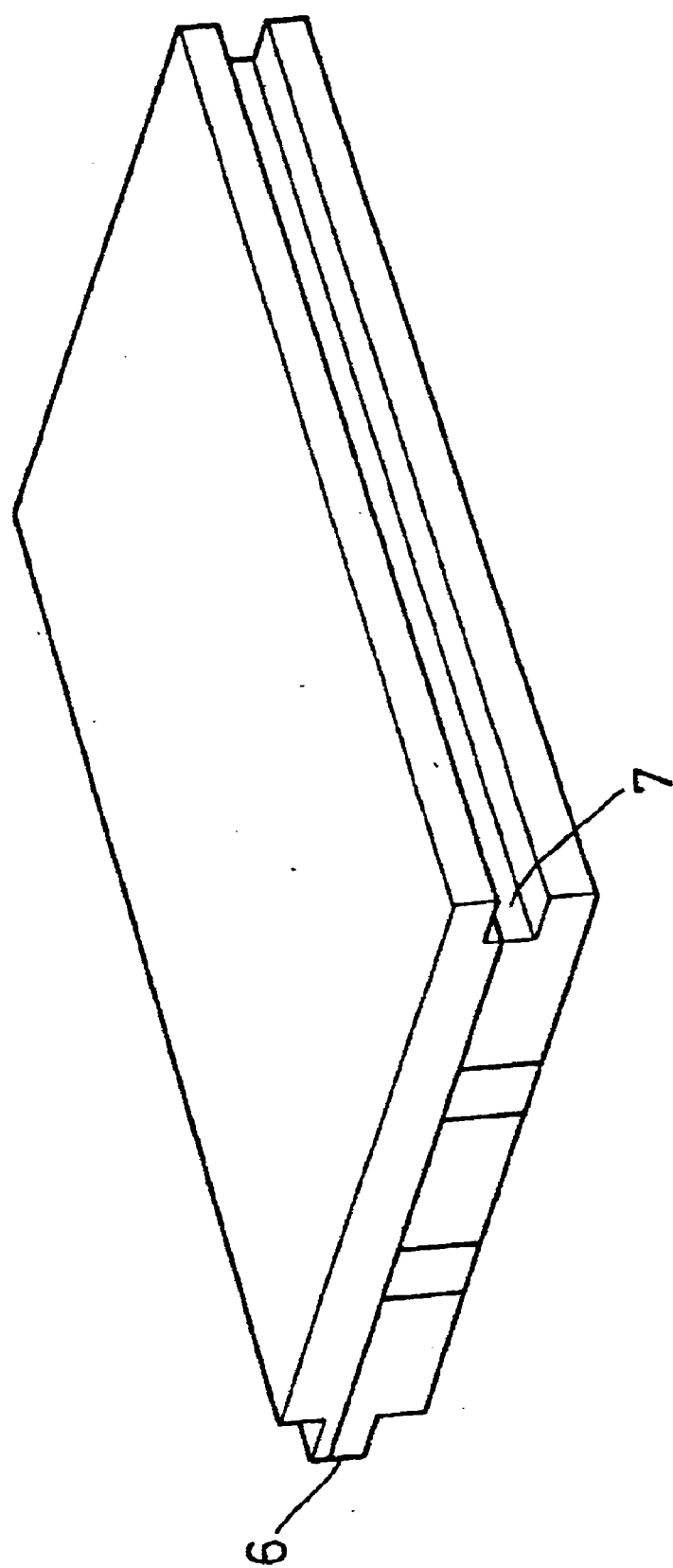
FIG. 5 is a perspective view of a first embodiment of a complex laminated bamboo board in accordance with the present invention.
Figure 6:
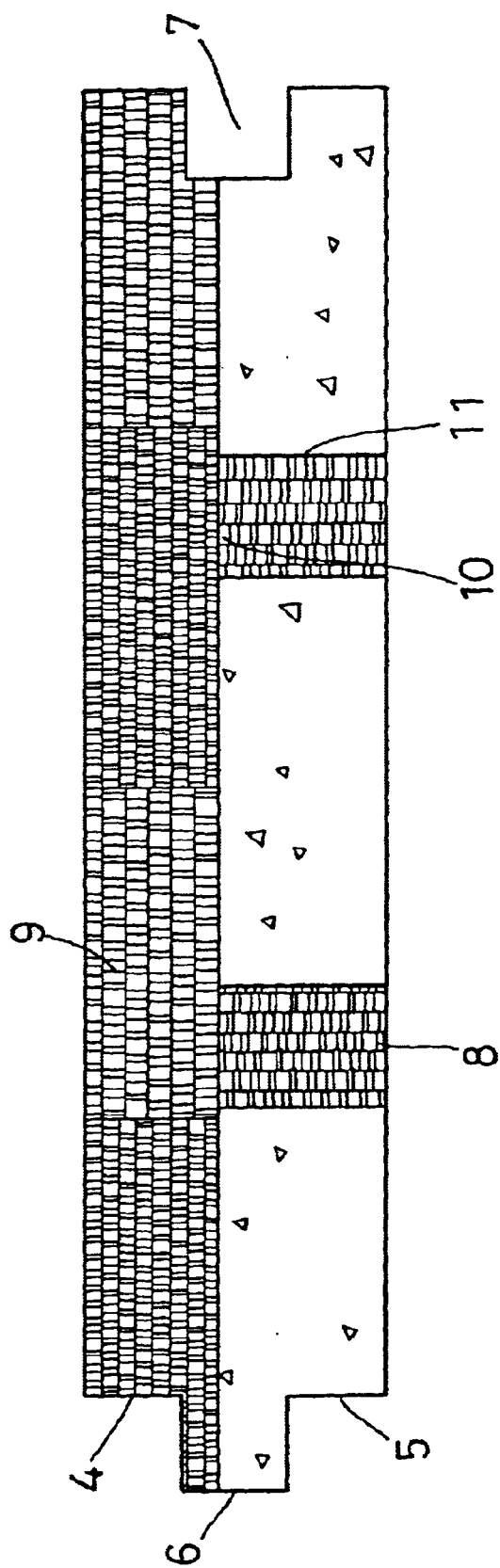
FIG. 6 is a cross-sectional view of the complex laminated bamboo board shown in FIG. 5.

Referring to FIGS. 5 and 6, there is shown a first embodiment of a complex laminated bamboo board in accordance with the present invention that is configured as a match board with a tongue (6) at one side and a groove (7) at the other side.

The inventive board includes an upper layer (4) and separate lower layers (5). The upper layer (4) consists of parallel strips (9) of bamboo glued together, and a pair of ribs (8) alongside and beneath the strips (9).

In the first embodiment, the ribs (8) extend downward from a bottom face of the upper layer (4), while the lower layers (5) are glued to the upper layer (4) beneath the bottom face and at sides of the ribs (8). The lower layer (5) can be made of any cheap, woody material different from bamboo, such as of fiberboard.

Figure 8:
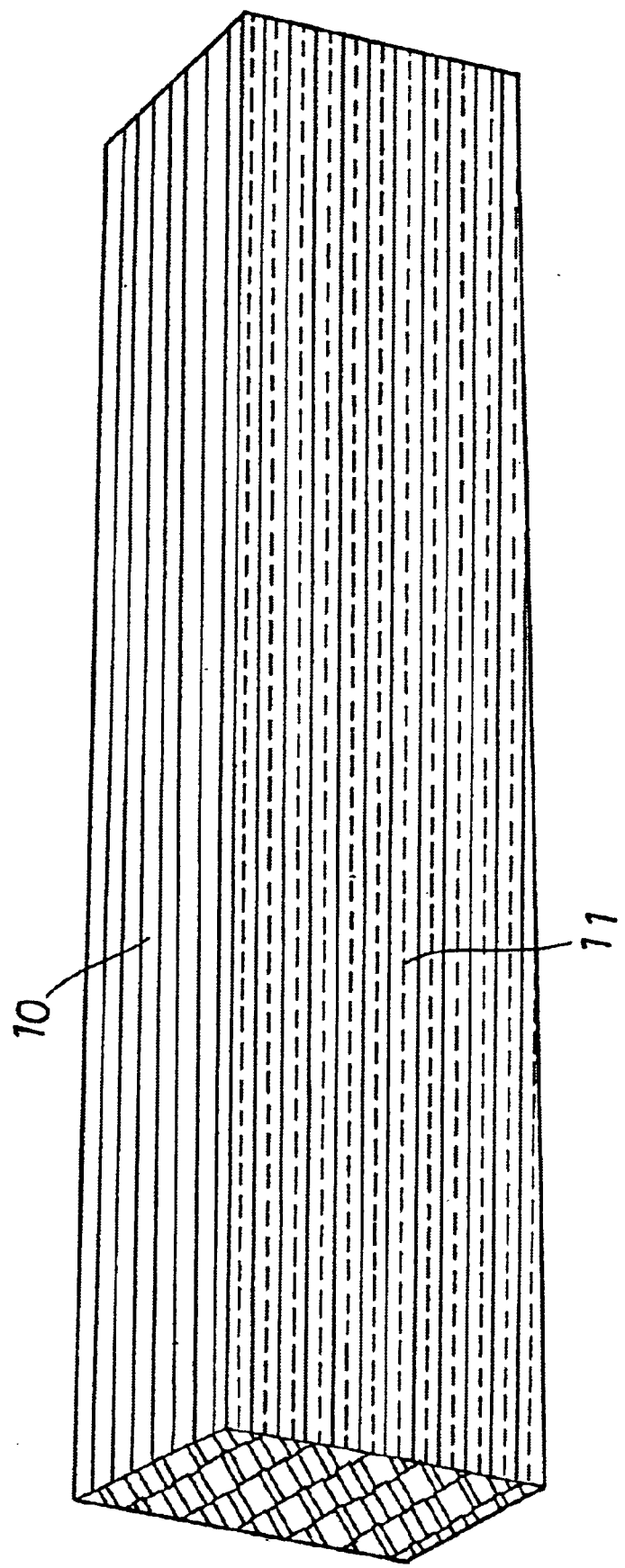
FIG. 8 is an enlarged perspective view of the rib shown in FIG. 7.

Each of the ribs (8) is a bar of bamboo, as best shown in FIG. 8, that has a cross section of a rectangle preferably in a height-width ratio about 1.5.

Figure 7:
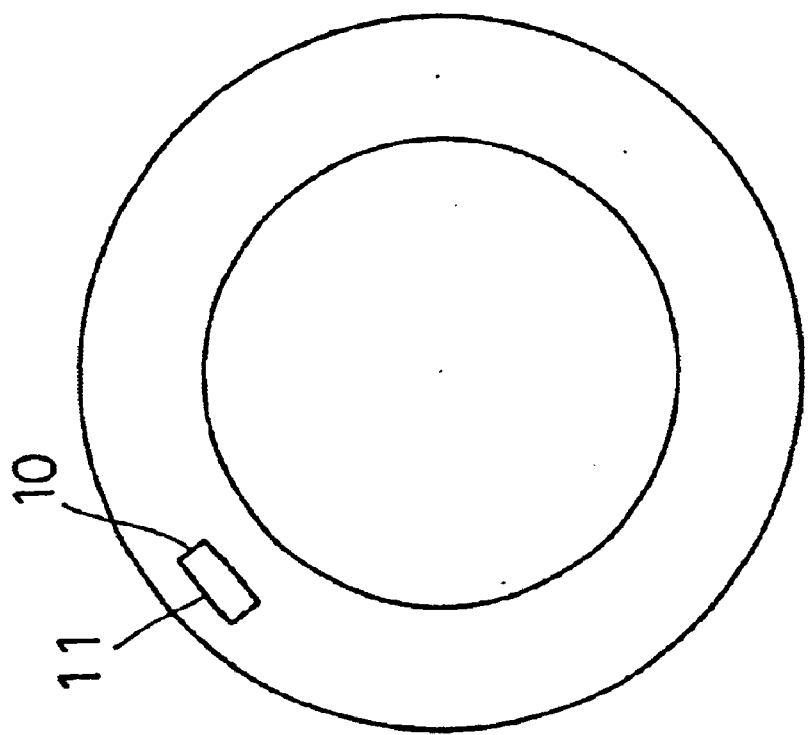
FIG. 7 is a cross-sectional view of the stem of a bamboo, showing how a rib involved in the present invention is obtained from the plant.

Furthermore, the rectangle has a pair of opposed horizontal sides (10) derived from radial sections in the stem of a bamboo and a pair of opposed vertical sides (11) derived from tangential sections in the same stem, as can be clearly seen in FIG. 7. It is at their upper horizontal sides (10) that the ribs (8) are glued to adjacent ones of the strips (9) above them.

Figure 9:
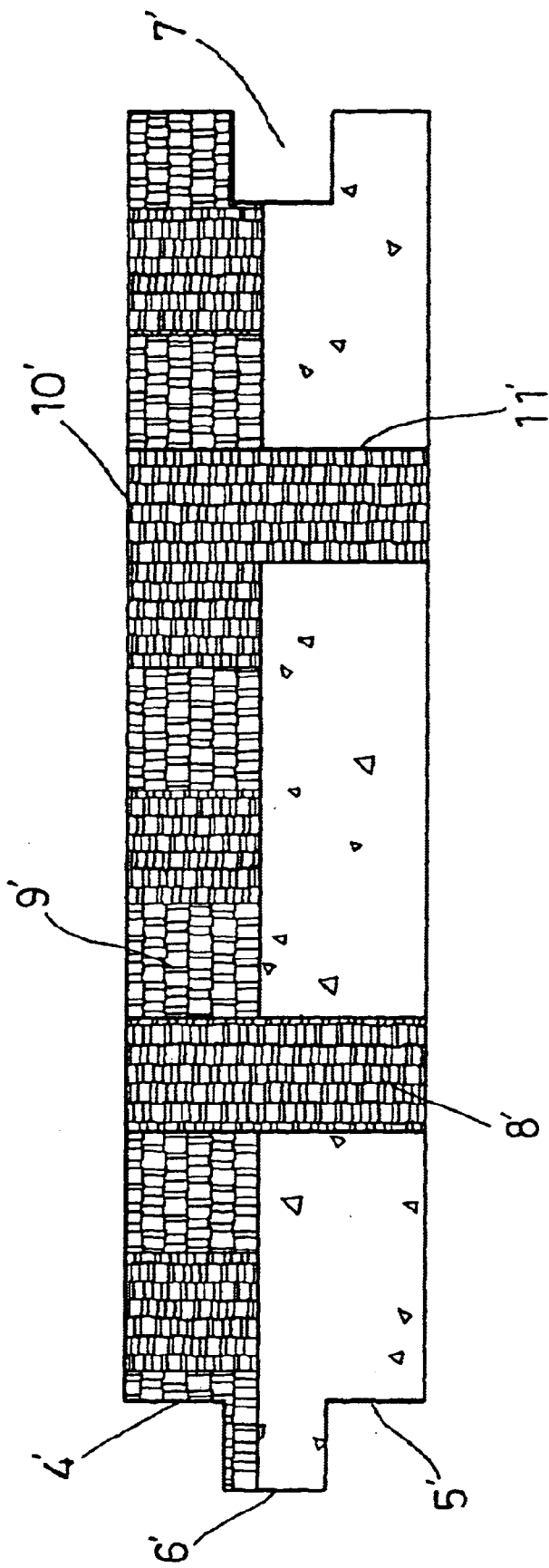
FIG. 9 is a cross-sectional view of a second embodiment of the complex laminated bamboo board in accordance with the present invention.

Referring to FIG. 9, there is shown a second embodiment of the complex laminated bamboo board in accordance with the present invention, configured as a match board having a tongue (6') at one side and a groove (7') at the other side.

The board also includes an upper layer (4') and separate lower layers (5'), with the upper layer (4') consisting of parallel strips (9') of bamboo and a pair of ribs (8') alongside but among the strips (9'). All the strips (9') and ribs (8') are glued together.

In this embodiment, however, the ribs (8') extend downward from a top face to below a bottom face of the upper layer (4'), and the lower layers (5') are glued to the upper layer (4') beneath the bottom face and at sides of the ribs (8'). The lower layer (5') here are preferably made of fiberboard too.

Each rib (8') here is a bar of bamboo with a cross section of a rectangle, preferably in a height-width ratio about 3, which, as described in the first embodiment, has a pair of opposed horizontal sides (10') derived from radial sections in the stem of a bamboo and a pair of opposed vertical sides (11') derived from tangential sections in the same stem. Now the ribs (8') are glued at their opposed vertical sides (10') to adjacent ones of the strips (9') beside them.

From the foregoing, it is apparent that the aforementioned material of bamboo used for the ribs (8, 8') and the strips (9, 9') of the upper layer (4, 4') can be substituted by any hard woody material, particularly by wood, without coming out of the sprits of the present invention.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A complex laminated bamboo board comprising:

an upper layer (4, 4') having a top face and a bottom face, said upper layer (4, 4') consisting of parallel strips (9, 9') and at least one rib (8, 8') alongside said strips (9, 9');

said rib (8, 8') having a cross section of a rectangle in a height-width ratio about 1.1~5 and extending downward below said bottom face of said upper layer from a level between said top face and said bottom face; and a plurality of lower layers (5, 5') glued to said upper layer (4, 4') beneath said bottom face and at sides of said rib (8, 8');

said strips (9, 9') and said rib (8, 8') in said upper layer (4, 4') all being made of bamboo and said lower layers (5, 5') being made of a woody material different from bamboo;

wherein said rectangle has a pair of opposed horizontal sides (10, 10') derived from radial sections in the stem of a bamboo and a pair of opposed vertical sides (11, 11') derived from tangential sections in said stem of said bamboo.

2. The complex laminated bamboo board as claimed in claim 1, wherein said rib (8) extends downward from said bottom face of said upper layer (4), and wherein said rib (8) is glued at its upper one of said horizontal sides (10) to adjacent one(s) of said stripe (9).

3. The complex laminated bamboo as claimed in claim 1, wherein said rib (8') extends downward from said top face of said upper layer (4'), and wherein said rib (8') is glued at said vertical sides (11') to adjacent ones of said strips (9').

4. A complex laminated bamboo board comprising:

an upper layer (4, 4') having a top face and a bottom face, said upper layer (4, 4') consisting of parallel strips (9, 9') and at least one rib (8, 8') alongside said strips (9, 9');

said rib (8, 8') extending downward to below said bottom face of said upper layer (4, 4') from a level between said top face and said bottom face; and a plurality of lower layers (5, 5') glued to said upper layer (4, 4') beneath said bottom face and at sides of said rib (8, 8');

wherein said strips (9, 9') and said rib (8, 8') in said upper layer (4, 4') are all made of a first woody material but said lower layers (5, 5') are made of a second woody material different from said first woody material, wherein said rib (8, 8') has a cross section of a rectangle in a height-width ratio about 1.1~5.

wherein said first woody material is wood, and wherein said rectangle has a pair of opposed horizontal sides (10, 10') derived from radial sections in the trunk of a tree and a pair of opposed vertical sides (11, 11') derived from tangential sections in said trunk of said tree.

5. The complex laminated bamboo board as claimed in claim 4, wherein said rib (8) extends downward from said bottom face of said upper layer (4) and wherein said rib (8) is glued at its upper one of said horizontal sides (10) to adjacent one(s) of said strips (9).

6. The complex laminated bamboo board as claimed in claim 4, wherein said rib (8') extends downward from said top face of said upper layer (4'), and wherein said rib (8') is glued at said vertical sides (11') to adjacent ones of said strips (9').

* * * * *